(12) United States Patent
Tidwell, Jr. et al.

(10) Patent No.: US 11,490,589 B2
(45) Date of Patent: Nov. 8, 2022

(54) MATERIAL FEEDER WITH MATERIAL FLOW ASSIST MECHANISM AND METHOD OF USE

(71) Applicant: Douglas Feeders and Accessories, LLC, Booneville, MS (US)

(72) Inventors: Jack R. Tidwell, Jr., Carbon Hill, AL (US); Douglas H. Knight, Booneville, MS (US)

(73) Assignee: Douglas Feeders and Accessories, LLC, Booneville, MS (US)

( * ) Notice: Subject to any disclaimer, the term of this patent is extended or adjusted under 35 U.S.C. 154(b) by 257 days.

(21) Appl. No.: 16/999,270

(22) Filed: Aug. 21, 2020

(65) Prior Publication Data

US 2021/0051919 A1   Feb. 25, 2021

Related U.S. Application Data

(60) Provisional application No. 62/889,736, filed on Aug. 21, 2019.

(51) Int. Cl.
*B65G 65/46* (2006.01)
*A01K 5/02* (2006.01)
*B65G 65/48* (2006.01)

(52) U.S. Cl.
CPC .......... *A01K 5/0225* (2013.01); *B65G 65/463* (2013.01); *B65G 65/4863* (2013.01)

(58) Field of Classification Search
CPC ................ B65G 65/463; A01K 5/0258; B01F 35/71775

USPC ........................................................ 366/157.4
See application file for complete search history.

(56) References Cited

U.S. PATENT DOCUMENTS

| 3,358,856 | A | * | 12/1967 | Weibull | ............... | B65G 65/365 |
|---|---|---|---|---|---|---|
| | | | | | | 414/302 |
| 3,672,518 | A | * | 6/1972 | Andersson | ........... | B65G 65/463 |
| | | | | | | 414/302 |
| 5,474,027 | A | * | 12/1995 | Pollock | .................. | B65G 19/16 |
| | | | | | | 119/57.4 |
| 6,786,366 | B2 | * | 9/2004 | Kramer | ................. | G01F 13/005 |
| | | | | | | 222/411 |
| 8,096,265 | B1 | * | 1/2012 | Wisecarver | .......... | A01K 5/0225 |
| | | | | | | 119/56.2 |
| 8,096,285 | B2 | * | 1/2012 | Rottenwohrer | ..... | F02D 41/2096 |
| | | | | | | 73/114.47 |

(Continued)

*Primary Examiner* — Joseph A Dillon, Jr.
(74) *Attorney, Agent, or Firm* — Clark & Brody LP (57) ABSTRACT

A material flow assist mechanism for a feed hopper using a vertically aligned rotating auger includes a frame, the frame having a pair of spaced apart first and second telescoping arms attached to frame, and a connector to link a shaft of a motor to the auger for auger and material flow assist mechanism rotation. Each of first and second telescoping arms have an elongated member mounted to a plate-containing end portion of each respective first and second telescoping arms. Rotation of the material flow assist mechanism by the motor rotates the first and second elongated members for material dispensing out a hopper. Dispensing of the material from the hopper results in extension of portions of the first and second telescoping arms such that the elongated members and plate travel with a top portion of the material as the top portion of the material in the hopper descends during dispensing.

7 Claims, 7 Drawing Sheets

(56) References Cited

U.S. PATENT DOCUMENTS

| | | | |
|---|---|---|---|
| 8,684,234 B2* | 4/2014 | Bacellar | B01F 35/71775 |
| | | | 222/145.5 |
| 8,893,654 B2* | 11/2014 | Wisecarver | A01K 5/0225 |
| | | | 119/51.11 |
| 9,301,495 B1* | 4/2016 | Bogart | A01K 5/005 |
| 9,950,856 B2* | 4/2018 | Stefanelli | B65G 65/463 |
| 10,343,123 B2* | 7/2019 | Metzler | B01F 23/23411 |
| 10,743,518 B2* | 8/2020 | Knight | A01K 5/0225 |
| 10,940,446 B2* | 3/2021 | Massicotte | B01F 25/53 |
| 10,974,916 B2* | 4/2021 | Turle | B65G 65/4836 |
| 2006/0086592 A1* | 4/2006 | Olds | B65G 65/463 |
| | | | 198/658 |
| 2008/0202435 A1* | 8/2008 | Nowacek | A01K 39/014 |
| | | | 119/51.01 |
| 2017/0006825 A1 | 1/2017 | Knight | |
| 2019/0233140 A1* | 8/2019 | Rapparini | B65B 1/26 |
| 2020/0247622 A1* | 8/2020 | Genovese | B65G 65/463 |
| 2020/0361726 A1* | 11/2020 | Olson | B65G 65/4836 |
| 2021/0016983 A1* | 1/2021 | Concannon | A01K 5/0275 |
| 2021/0107752 A1* | 4/2021 | Martin | B65G 69/0441 |
| 2021/0206589 A1* | 7/2021 | Ruppert | B65G 65/4809 |
| 2021/0324152 A1* | 10/2021 | Danner | B01F 35/512 |

* cited by examiner

MATERIAL FEEDER WITH MATERIAL FLOW ASSIST MECHANISM AND METHOD OF USE

This application claims priority from provisional application No. 62/889,736, filed on Aug. 21, 2019, which is incorporated by reference in its entirety herein.

FIELD OF THE INVENTION

The invention discloses a material feeder device that has a material flow assist mechanism that assists in directing material to an auger mechanism for feeding purposes.

BACKGROUND ART

In the prior art, the use of vibrating mechanism to dispense powder is known as is shown in U.S. Pat. No. 8,096,285 to Wisecarver. These kinds of powder dispensers rely on a mechanism to vibrate the hopper that dispenses the powder. However, when powder is damp or wet, the vibrating mechanism does not have sufficient vibration powder to move the wet or damp powder and dispensing cannot be accomplished.

Another example of a feeder is shown in Pre-Grant Publication No. 2017/0006825 to Knight, which is incorporated in its entirety herein and referred to below as the Knight publication.

As such, a need exists for an improved material feeder or dispenser, and particularly a powder material feeder, and the invention responds to this need.

SUMMARY OF THE INVENTION

An object of the invention is to improve the dispensing of a material using an auger or other similar feeding mechanism.

In one embodiment, the material feeder device includes a hopper to hold the material to be dispensed. Vertically arranged in the hopper is an auger that is connected to a motor to rotate the auger in the hopper. The motor is preferably a slow rotating motor like that disclosed in the Knight publication, i.e., one that is high torque, low RPM, and quiet so that if the material feeder is used in the wild to dispense animal feed, it is quiet and not disturbing to the animals.

The hopper has an open material input end that is used to charge the material to be dispensed. The hopper also has a discharge end with an opening aligned with an end of the auger so that material moved by the auger is dispensed from the hopper.

A material feeder also includes a mechanism that assists in movement of the material toward the auger during auger rotation. This mechanism comprises a frame that has two telescoping arms and a cross member extending between the arms. The cross member has an auger-motor connector. The auger-motor connector is configured to connect the frame to an end of a shaft of the auger and, in turn, connect to a motor so that the motor can rotate both the frame with the arms and the auger.

Attached to each end of the arms is an elongated member that extends in a direction perpendicular to an axis of the auger shaft. The elongated member could be flat or cup shaped. The arms are arrangement asymmetrically with respect to the auger-motor connector, with a first arm closer to the auger-motor connector and a second arm spaced further from the auger-motor connector than the first arm.

The spacing of the arms with respect to the frame is such that when the frame is positioned within the hopper, the elongated member of the first arm contacts an inner wall of the hopper during its rotation. The elongated member of the second arm is positioned so that it is between the auger and the material near the hopper inner wall being agitated by the elongated member of the first arm.

When the motor is operating, both the auger and the frame and its arms and elongated members rotate. The elongated member of the first agitates material near the hopper inner wall and the elongated material agitates material between the auger and the material being agitated by the elongated member of the first arm. The presence of both elongated members causes a dual agitation of the material, thus improving the flow of material in the hopper to flights of the auger.

The frame is also equipped with a plate that extends between ends of the arms and between the elongated members and where the arms attach to the frame. The plate also has an opening to allow a shaft of the auger to pass through the plate and attach to the auger-motor connector. The plate would also rotate with the elongated members and frame and assist in the agitation of the material in the hopper. With the plate being attached to ends of the arms, the plate provides more stability to the free ends of the arms during rotation of the frame. The plate can be made out of any material, metallic or non-metallic. The plate could also be made with protrusions extending from a lower surface thereof to assist in agitation of the material being dispensed from the hopper. The protrusions would take any shape as long as they extended from the lower surface to provide additional surface to contact the material being dispensed. Examples could include baffles, conical or semicircular shapes, and the like.

The arms are freely telescoping and can be constructed similar to other telescoping articles like poles for pool cleaning or brushing, boat deck brushes, paint roller extensions, etc. The only difference is that for these poles, brushes, etc., is that the collar that is normally tightened to set the length of the pole is not used and the pole sections would freely extend due to gravity. Since these kinds of telescoping mechanisms are well known, a further description is not needed. When the hopper is fully, the plate and elongated members rest on the top of the material in the hopper. When the elongated members and plate rotate along with the auger, the material is dispensed from the hopper and the level of the material in the hopper recedes. Since the arms are freely telescoping, portions of the arms would extend from the frame with the change in height of the hopper material and the elongated members and plate would remain in contact with the material in the hopper. This movement of the plate and elongated members would continue until the material is completely dispensed from the hopper. Once the hopper is empty, the material movement assist mechanism can be removed from the auger and separated from the motor, the hopper can be filled, and the dispensing cycle can be restarted.

The degree of telescoping of the arms depends on the size of the hopper being used for dispensing. For a twenty gallon hopper, a telescoping length capability of about 1 to 2 feet would be desirable. The telescoping arms can be made of any material that would provide the durability needed to support the elongated members during rotation.

The elongated member can be made out of any material, although a flexible material, e.g., a conveyor belt type material, is preferred since is more forgiving and puts less load on the motor when the elongated members are contacting both the hopper inner wall and material to be dispensed. The elongated members could have a flat surface and edges for agitation or could be concave in shape as well to better hold material during the rotation of the elongated member and direct material to the auger. The length of the members should be such that their rotation spans a sufficient area long the top portion of the material in the hopper to agitate the material both near the hopper inner wall and material between the hopper inner wall and the auger.

The material for dispensing can be virtually any material that needs to be dispensed, but a preferred material is a powder material as this material is much harder to dispense using conventional dispensing mechanism. The inventive feeder is ideally suited to dispense a powder or powder-like material given the presence of the material flow assist mechanism. More preferred materials include animal feed, both in powder form, e.g., rice bran, and larger sized materials as well. However, minerals, fertilizers, insecticides, herbicides, etc. can be used. In fact, virtually any granular or powder material is suitable for use with the inventive device if in need of dispensing.

The frame material can also be made of any material, although for longevity of the device operation, metallic materials are preferred.

The dispensing end of the hopper can have virtually any configuration provided the opening is sufficiently large to allow the material being moved by the auger to exit the hopper. In a preferred configuration, it is desirable to retain the free end of the auger opposite the attachment to the frame so that the auger is held in a vertical orientation when rotating and does not excessively wobble when in use. This retention in one example could be just a plate that passes over the dispensing open end and is attached to the hopper so that the auger end can rest on a surface of the plate during rotation. Since the free end of the auger is not attached at the bottom of the hopper, the auger with the material flow assist mechanism could be easily removed from the hopper for filling or service to the feeder device.

The hopper also has a cover that can support the motor driving the frame and the auger. The motor shaft would extend through the cover and connect to the auger-motor connector to allow for rotation of the auger and frame of the material flow assist mechanism.

The auger-motor connector can be any kind of a connection that allows the end of the shaft of the auger to connect to the frame and the end of the shaft of the motor to connect to the frame, so that the motor shaft rotation both rotates the frame and auger. For example, the auger-connector could have a female end that receives the shaft end of the auger and a female end that received the end of the motor shaft. A coupling could also be used to allow for a male end on the auger-motor connector to connect to a male end for the auger shaft and/or the motor shaft.

The device could also have features of the feeder of the Knight publication in terms of a timer to operate the motor for a given period of time. The motor could be battery or solar powered, or could be based on a 120 volt power input.

The hopper can include structure to allow it to be attached to a tree, similar to that shown in the Knight publication and can be made of any materials, although an aluminum material is preferred due to its lighter weight.

DETAILED DESCRIPTION OF THE INVENTION

One embodiment of the invention is shown in FIGS. 1-7b.

Figure 1:
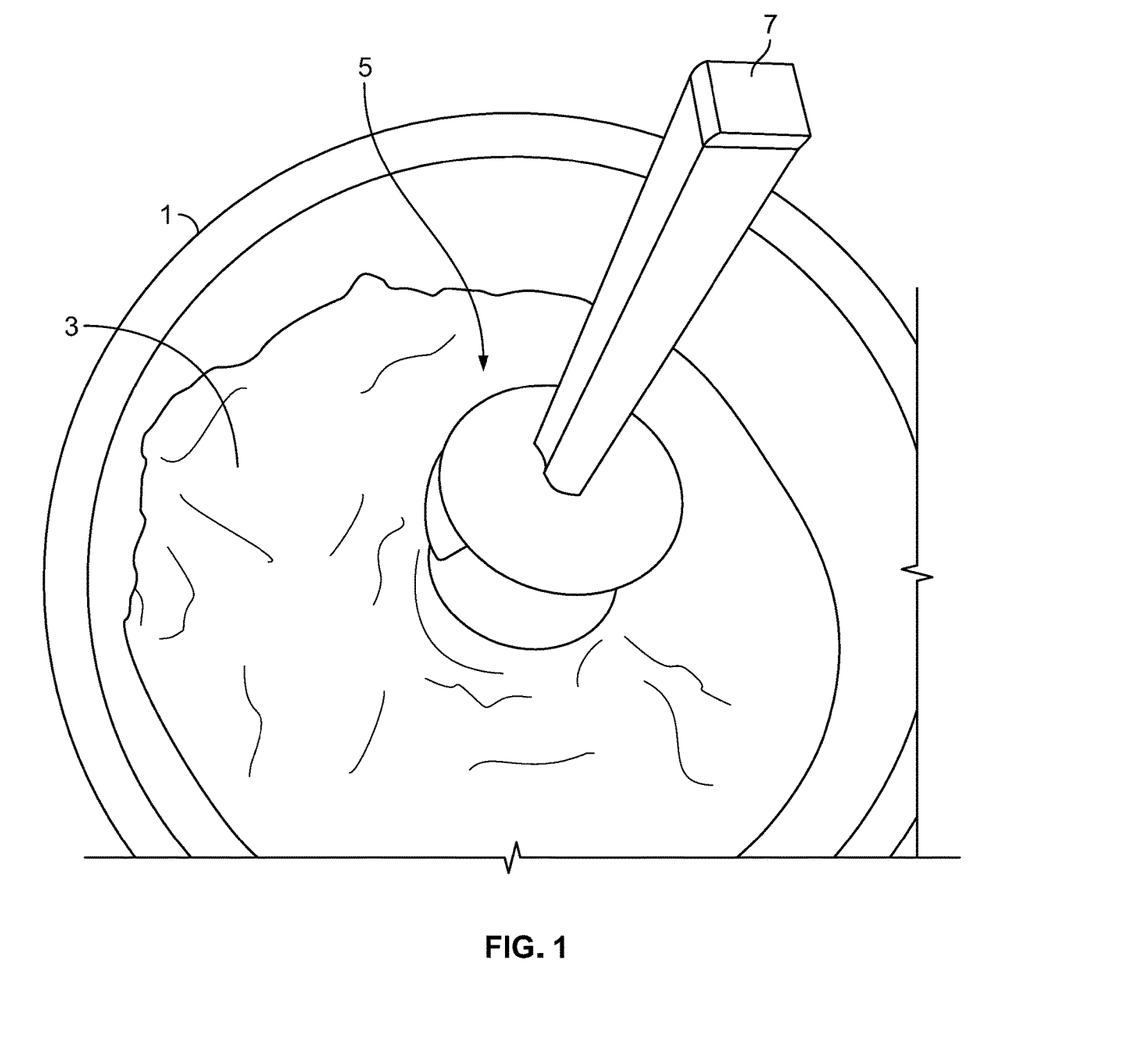
FIG. 1 shows a top perspective view of a portion of a hopper and auger combination.

FIG. 1 shows a portion of a hopper 1 with a powder material 3 in the hopper and an auger 5 vertically arranged in the hopper. The end 7 of the auger attaches to the auger-motor connector of the material flow assist mechanism (hereinafter called the mechanism).

Figure 2:
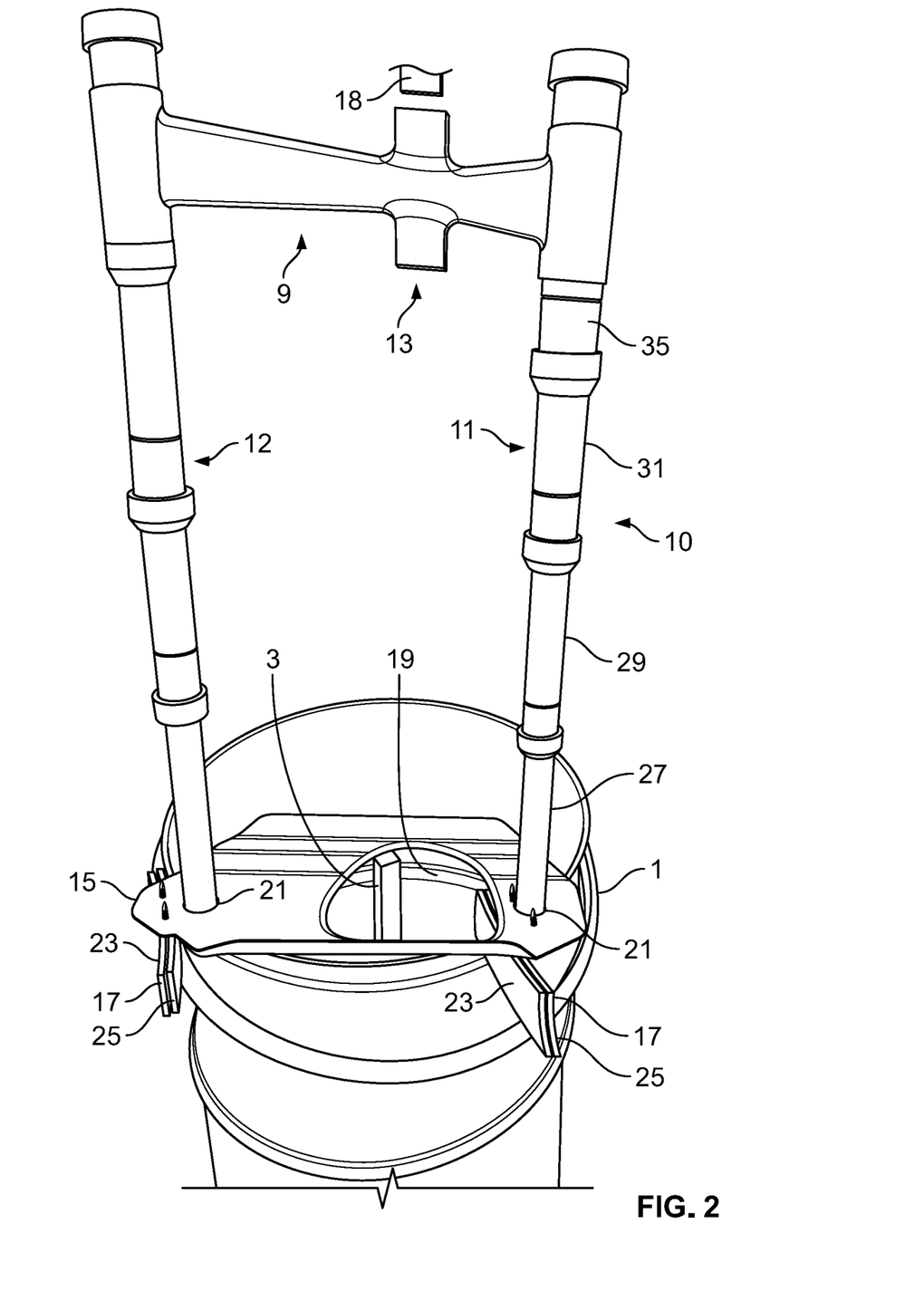
FIG. 2 shows one embodiment of the material flow assist mechanism of the invention resting on a hopper and in a fully telescoped state.

FIG. 2 shows the mechanism in a fully telescoped state with the mechanism resting on top of the hopper 1, with only a portion of the hopper illustrated. The mechanism is designated by the reference numeral 10 and includes a frame 9, the telescoping arms 11, 12, the auger-motor connector 13, a plate 15, and the elongated members 17. Ideally, the telescoping arms are sized in length so that the plate 15 and elongated members 17 reach close to or at the bottom of hopper so that all material in the hopper is agitated by the mechanism as part of the dispensing operation.

The plate 15 has an opening 19 to allow the auger 5 or a part thereof to pass through the plate 15. Two other openings 21 are provided allow the ends of the telescoping arms 11, 12 to pass through the plate 15. Attached to the ends of the telescoping arms 11, 12 are the elongated members 17. In this embodiment, the elongated members 17 are rectangular in shape and have surfaces 23 and edges 25 that assist in agitation of the material 3 in the hopper 1 when the frame 9 is rotated along with the auger 5. One of the elongated members 17 is attached to one side of the end of the telescoping arm 12 so that it would be positioned nearer to the inside wall of the hopper 1. The other elongated member 17 is attached to the other telescoping arm 11 so that it would be closer to the auger 5. However, the elongated members could be attached to the ends of the telescoping arms so that they are beneath a longitudinal axis of the arms as well, not as offset to the arms as shown in FIG. 2. Important is that one of the elongated members is closer to the hopper inside wall and the other elongated member is closer to the auger to better direct the material, e.g., a powder in the hopper to the auger for dispensing.

In this embodiment, the telescoping arms 11 and 12 each have four portions 27, 29, 31, and 33 that are sized appropriately to allow one portion, e.g., portion 27, to freely extend from its adjacent portion 29. However, the arms 11 and 12 could be made with more or fewer portions depending on the size of the hopper and the extent of the travel of the material being dispensed. Smaller size hoppers may only require two or three portions whereas larger hoppers may require more than four portions. The diameters of the portions of the telescoping arms can vary as long as the arms are durable enough to support the plate and the elongated members during rotation.

FIG. 2 also shows the asymmetric mounting of the telescoping arms 11 and 12 on the frame 9. That is, telescoping arm 11 is closer to the auger-motor connector 13 as compared to telescoping arm 12. With this spacing, the elongated member 17 on telescoping arm 12 is positioned nearer the inner wall of the hopper 1 and agitates the material in this area. The elongated member 17 on the telescoping arm 11 is then positioned closer to the auger 3 and agitates material in the hopper closer to the auger. The combination of the two arms 11 and 12 provide a dual agitation of the material in the hopper and better direct the material near the hopper inner wall to the auger. The motor shaft is designated by the reference numeral 18 and shown in an unattached state to the auger-motor connector 13.

Figure 3:
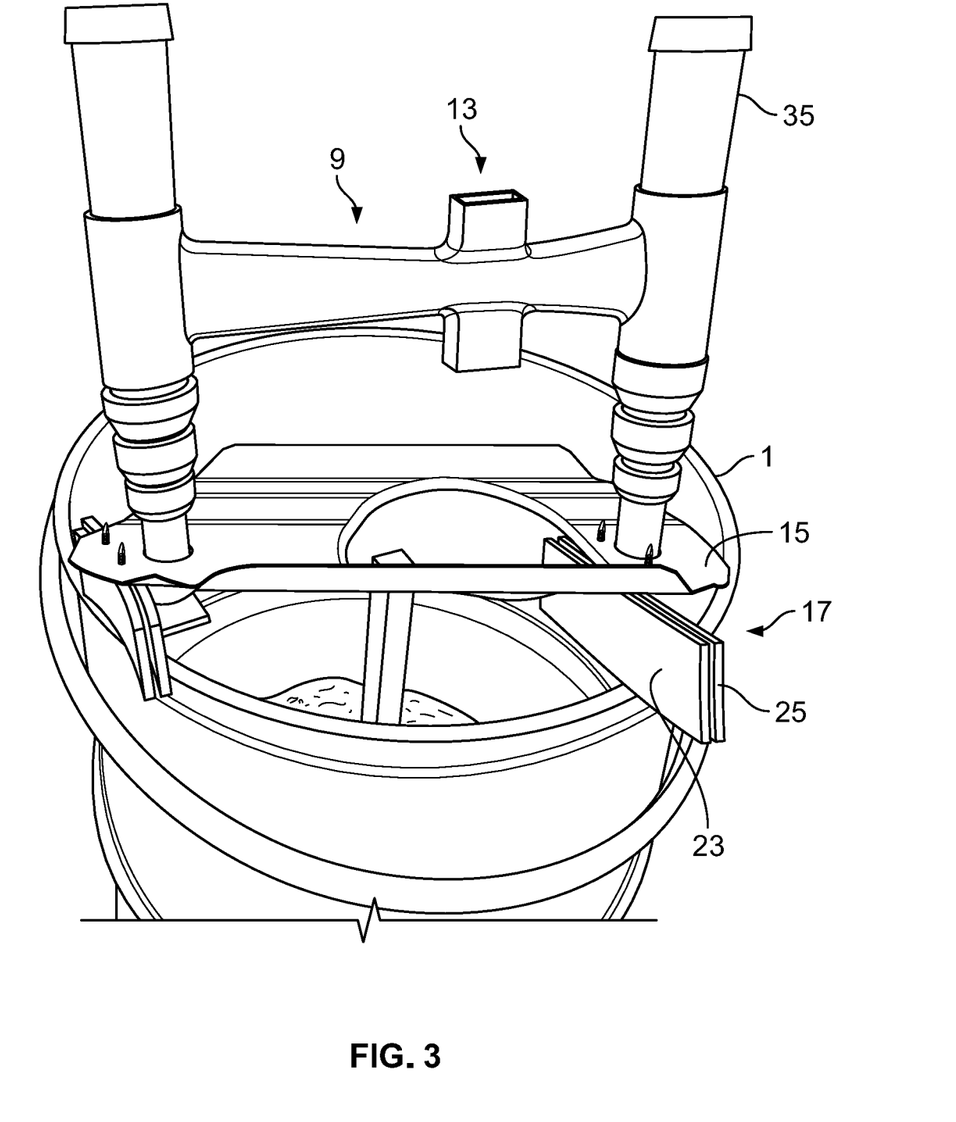
FIG. 3 shows the material flow assist mechanism of FIG. 2 in a fully collapsed state.

FIG. 3 shows the mechanism 10 in a fully collapsed state, again just resting on the top of a portion of the hopper 1. This state would likely correspond to the mechanism configuration when the hopper 1 is full with the material to be dispensed. As the material is dispensed from the hopper, the portions of the telescoping arms would extend and the plate 15 and elongated members 17 would continue to be in contact with a top surface of the material 3 in the hopper for agitation.

Figure 4:
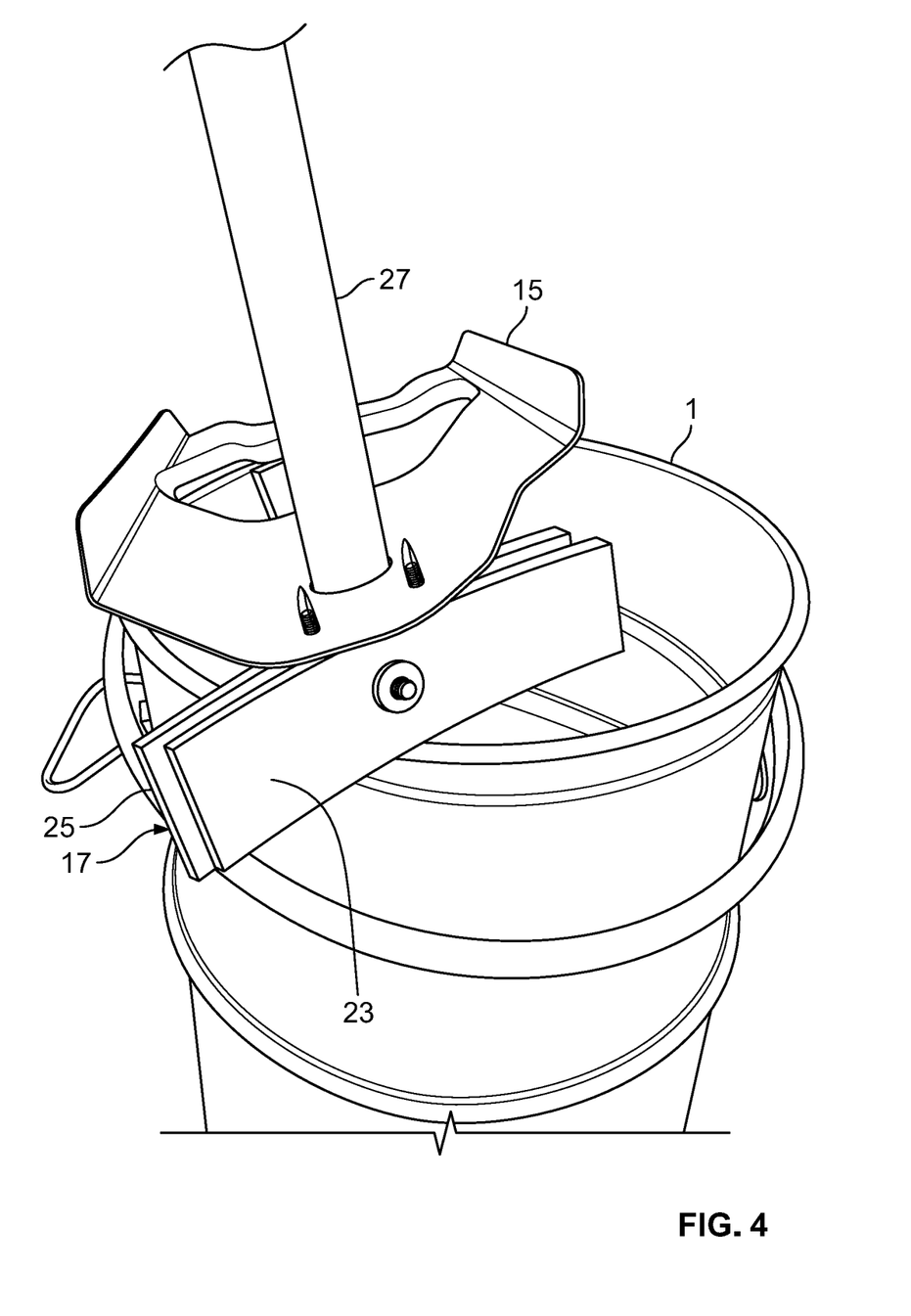
FIG. 4 shows an enlarged view of the plate and one of the elongated members of the material flow assist mechanism of FIG. 2.

FIG. 4 shows a view of the plate 15 and one of the elongated members 17. The elongated member 17 is attached to the portion 27 of the telescoping arm 11 by a nut and bolt arrangement but any kind of attachment could be used to mount the elongated member to the telescoping arm 11.

Figure 5:
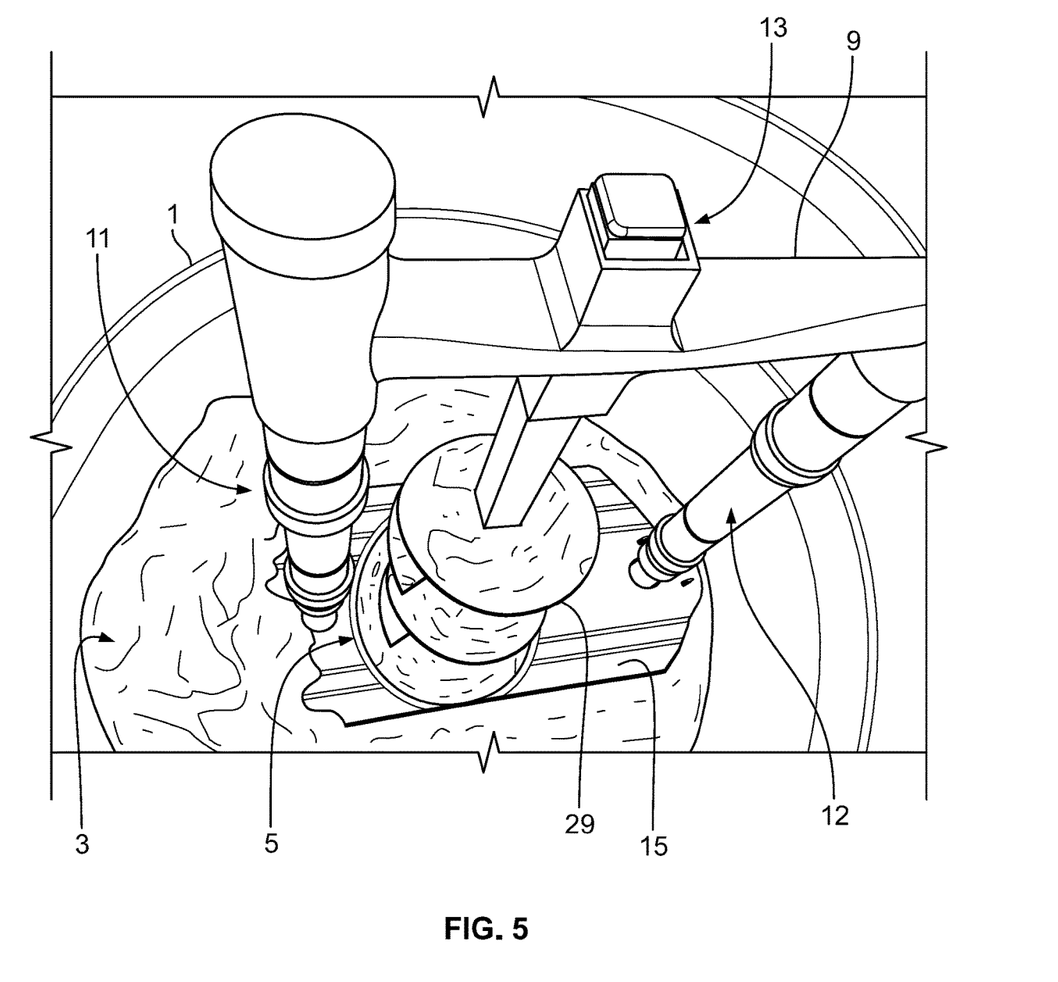
FIG. 5 shows the material flow assist mechanism of FIG. 2 attached to the auger of FIG. 1 and in an exemplary use.

FIG. 5 shows the mechanism 10 in an operating state in the hopper 1 (a portion shown) and after a portion of the material 3 in the hopper has been dispensed. With the material level lowered, flights 29 of the auger can be seen. Also, the relative positions of the telescoping arms 11 and 12 are seen, with arm 11 closer to the auger than arm 12. As the material 3 would dispense, the telescoping arms would freely extend and the elongated members would scrape and agitate the top portion of the material 3 while the frame 9 is rotated by the motor (the motor shaft is not shown in this drawing).

Figure 6:
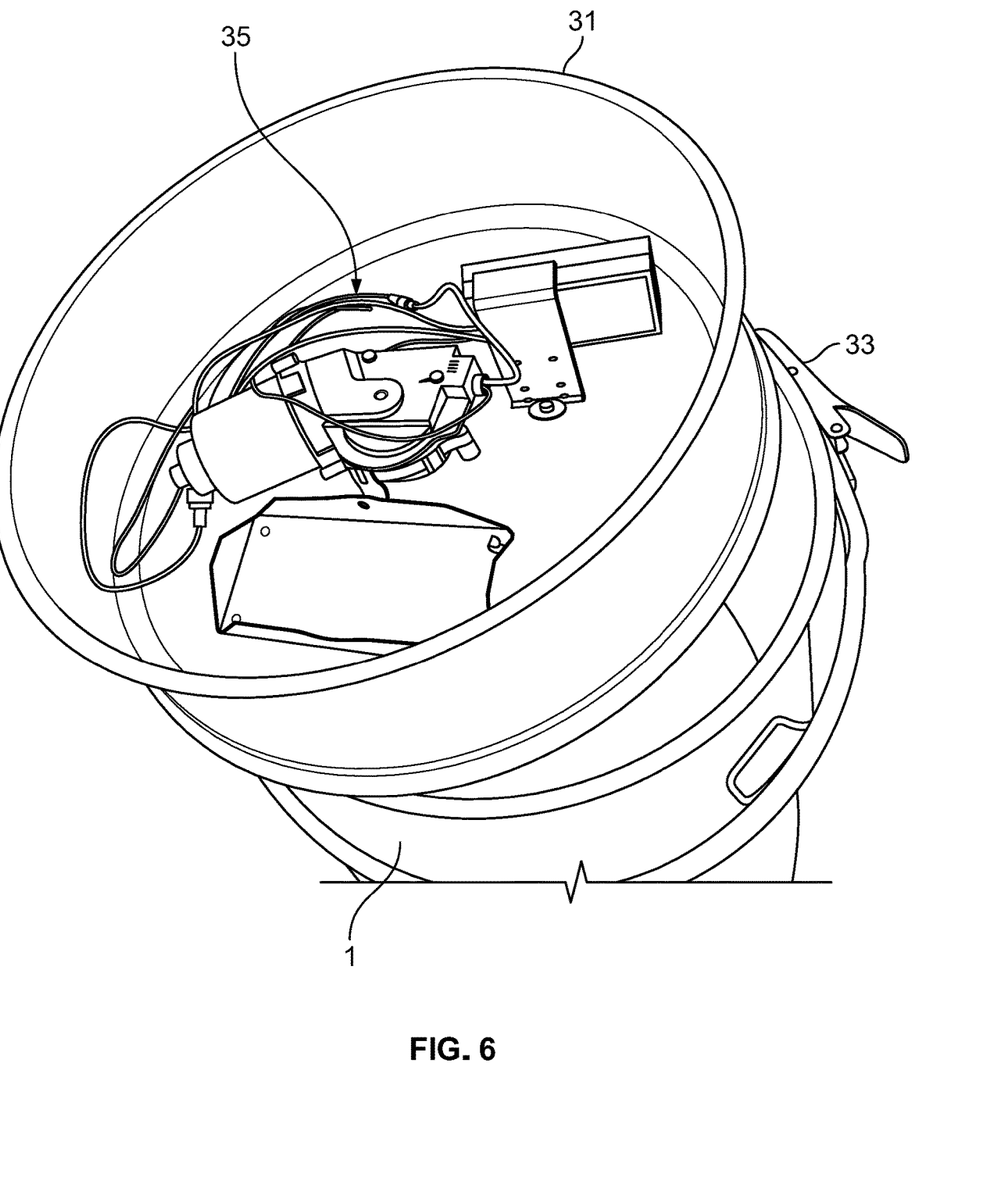
FIG. 6 shows a perspective view of the motor and cover assembly for use with the material flow assist mechanism of FIG. 2.

FIG. 6 shows the cover 31 of the hopper 1. The cover 31 is secured to the hopper using the lockable collar 33. The cover 31 retains the motor 35 in place so that the motor shaft (not seen) can connect to the auger-motor connector 13 and drive the frame 9 of the mechanism. As noted above, the motor 35 is a high torque low RPM motor and an example of such a motor is a windshield wiper motor that is normally found in vehicles. These motors are typically three speed motors so that the elongated members can be rotated at different speeds when dispensing material.

Figure 7A:
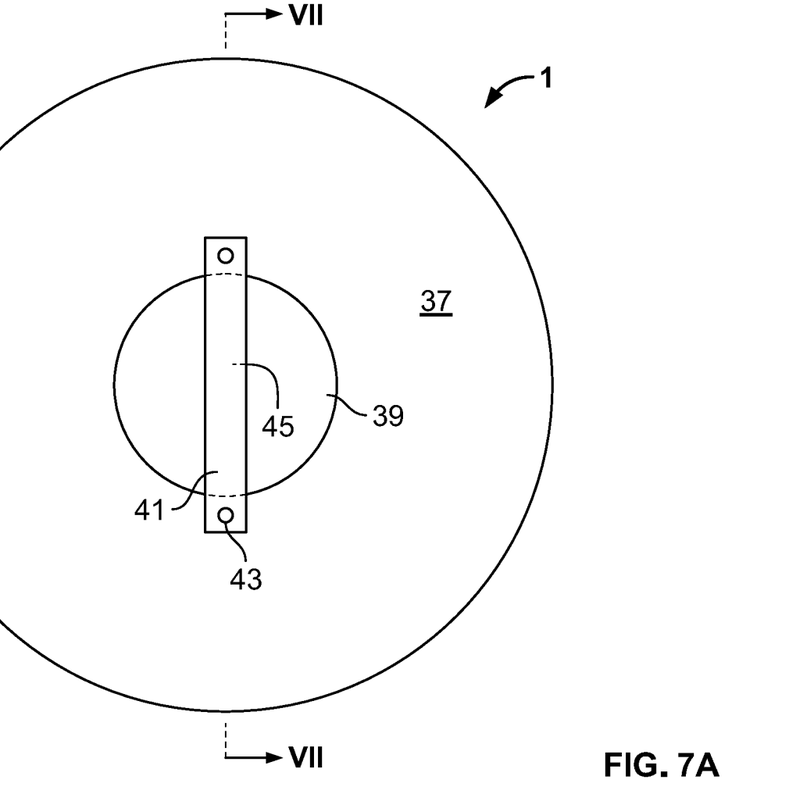
FIG. 7A shows a schematic view of the bottom of the hopper of FIG. 1.
Figure 7B:
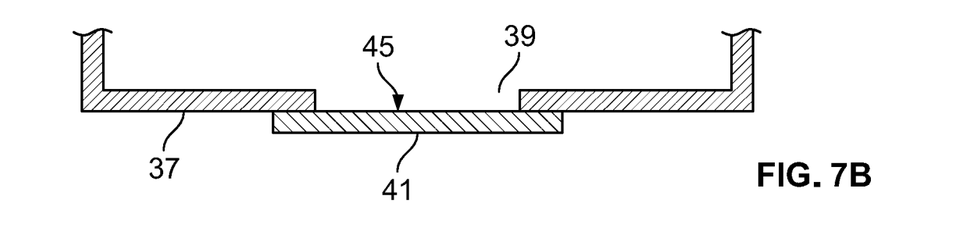
FIG. 7B shows a sectional view along the line VII-VII of FIG. 7B.

FIG. 7A shows a view of the bottom 37 of the hopper with the opening 39 therein and FIG. 7B shows a cross section through the line VII-VII of FIG. 7A. A plate 41, which can be attached at 43 to the bottom 37 of the hopper in any way, fasteners, welding, and the like, crosses over the opening 39 and provides a resting place 45 for the auger to maintain its vertical orientation and keep it steady during rotation. One example of an opening is a 3 inch opening but other size openings and augers could also be used. Typically, a 3 inch opening is designed for an auger that has a diameter of around 3 inches. Also, the bottom of the hopper could also include a device that could close off the opening to prevent material from exiting the opening. This device could be closed when the hopper is filled and then opened when the material is being dispensed. The device could be any type of a device to form the closing and opening function, a gate valve would be one example.

Figure 7C:
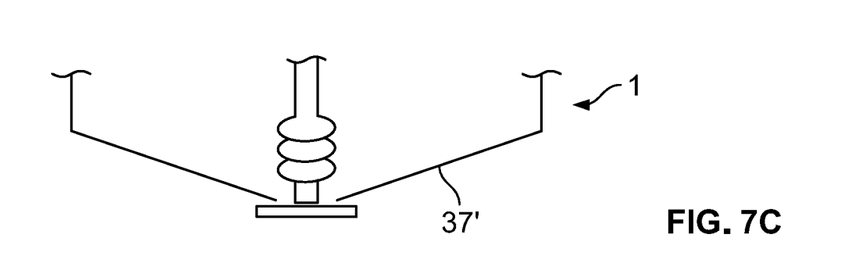
FIG. 7C shows a schematic of another embodiment of the hopper bottom with a sloped configuration.

While not shown, the hopper can be mounted to a structure like a tree in a similar fashion as the hopper shown in the Knight publication. The hopper can also be made to stand on its own by mounting it to legs, such mounting arrangements known in the art. Also, a distributor of the material being dispensed from the hopper can also be used, like the one shown in the Knight publication or any other structure that would disperse the material existing the hopper opening. Also, although a flat bottom is shown for the hopper, it could be sloped as well, see 37' of FIG. 7C.

The invention provides significant improvements in the feeding of powdered material by the use of the material flow assist mechanism.

As such, an invention has been disclosed in terms of preferred embodiments thereof which fulfills each and every one of the objects of the present invention as set forth above and provides a new and improved material feeder and method of use.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. A material feeder comprising:
   a hopper having a top opening and a bottom opening;
   a hopper cover configured to cover the top opening;
   an auger arranged vertically in the hopper;
   a material flow assist mechanism configured to be positioned in the hopper to assist in material flow to the auger;
   a motor for rotating the material flow assist mechanism and the auger,
   the material flow assist mechanism further comprising:
   a frame including a pair of spaced apart first and second telescoping arms attached to frame and a connector to link a shaft of the motor to the auger for auger and material flow assist mechanism rotation, the spacing of the first and second telescoping arms being asymmetric so that the first telescoping arms is closer to a longitudinal axis of the frame so as to position the first telescoping arm closer to the auger than the elongated member of the second telescoping arm;
   each of the first and second telescoping arms including an elongated member mounted to an end portion of each respective first and second telescoping arms;
   a plate attached to the end portions of the first and second telescoping arms above each of the elongated members;
   wherein the motor rotates the material flow assist mechanism and auger, the rotation of the material flow assist mechanism rotating the first and second elongated members and agitating material in the hopper under the plate for material dispensing out a bottom opening of the hopper and dispensing of the material from the hopper results in extension of portions of the first and second telescoping arms such that the elongated members and plate travel with a top portion of the material as the top portion of the material in the hopper descends during dispensing.

2. A material flow assist mechanism for a feed hopper using a vertically aligned rotating auger comprising:

a frame including a pair of spaced apart first and second telescoping arms attached to frame and a connector to link a shaft of a motor to the vertically aligned rotating auger for vertically aligned rotating auger and material flow assist mechanism rotation, the spacing of the first and second telescoping arms being asymmetric so that the first telescoping arms is closer to a longitudinal axis of the frame so as to position the first telescoping arm closer to the vertically aligned rotating auger than the elongated member of the second telescoping arm;

each of the first and second telescoping arms including an elongated member mounted to an end portion of each respective first and second telescoping arms;

a plate attached to the end portions of the first and second telescoping arms above each of the elongated members;

wherein the motor rotates the material flow assist mechanism and vertically aligned rotating auger, the rotation of the material flow assist mechanism rotating the first and second elongated members and agitating material in the hopper under the plate for material dispensing out a bottom opening of the hopper and dispensing of the material from the hopper results in extension of portions of the first and second telescoping arms such that the elongated members and plate travel with a top portion of the material as the top portion of the material in the hopper descends during dispensing.

3. The feeder of claim 1, wherein the motor is a high torque low RPM motor.

4. The feeder of claim 1, wherein the elongated members have a generally flat surface or a concave surface.

5. A method of dispensing a material comprising:
providing the feeder of claim 1,
filling the hopper with a material to be dispensed,
actuating the motor to rotate the auger and the material flow assist mechanism for a period of time to dispense the material from the hopper.

6. The method of claim 5, wherein the material is in a granular or powder form.

7. The method of claim 6, wherein the material is animal feed.

\* \* \* \* \*